No. 680,889. Patented Aug. 20, 1901.
J. M. SCHUTZ.
COFFEE COMPOUND AND PROCESS OF MAKING SAME.
(No Model.)
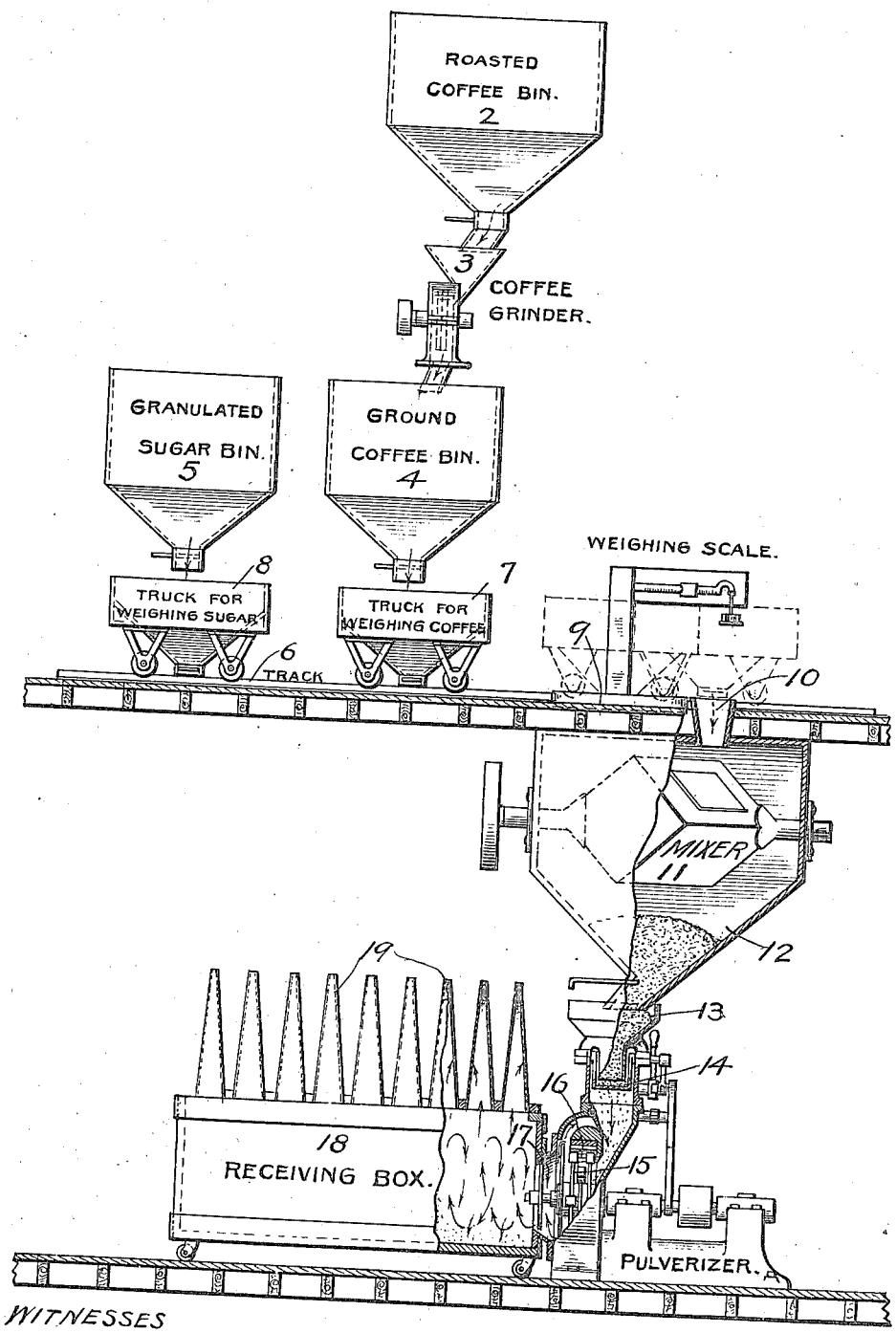
WITNESSES
INVENTOR
JOSEPH M. SCHUTZ.
BY Paul O Hawley
his ATTORNEYS.

UNITED STATES PATENT OFFICE.

JOSEPH M. SCHUTZ, OF MINNEAPOLIS, MINNESOTA, ASSIGNOR OF ONE-HALF TO CHARLES G. HAWLEY, OF SAME PLACE AND CHICAGO, ILLINOIS.

COFFEE COMPOUND AND PROCESS OF MAKING SAME.

SPECIFICATION forming part of Letters Patent No. 680,889, dated August 20, 1901.

Application filed November 12, 1900. Serial No. 36,182. (No specimens.)

*To all whom it may concern:*

Be it known that I, JOSEPH M. SCHUTZ, of the city of Minneapolis, county of Hennepin, and State of Minnesota, have invented a certain new and Improved Coffee Composition and Process of Manufacturing the Same, of which the following is a specification.

My invention relates to coffee and like materials from which beverages are made, and has to do particularly with a new article of manufacture from coffee and a process of manufacturing the same.

The object of my invention is to preserve coffee or like material and adapt the same to the making of the beverage almost instantaneously and without the usual process of boiling.

A particular object of the invention is to prepare the coffee for instant use and at the same time retain the full value thereof as a beverage substance and also the actual money value of the material when compared weight for weight with the coffee that is in common use. I accomplish this by pulverizing the coffee or like bean with sugar or a like substance, the presence of which in the beverage is not objectionable.

My invention consists generally in a new coffee or like composition containing sugar, which in turn contains a large proportion of both the essential and fixed oils of the coffee; and my invention further consists in a process of manufacturing my novel coffee composition, and resides, primarily, in subjecting the coffee-beans to a separating process, whereby the oils are separated from the cellular tissue without danger of infiltration of said tissue and insuring the infiltration of sugar.

The invention will be more readily understood by reference to the accompanying drawing, forming a part of this specification.

The numeral 2 represents a suitable bin or hopper for roasted coffee or other material, such as cocoa. From this bin the coffee-beans are fed to a bur-mill 3, wherein the coffee is coarsely ground or granulated, the granulated coffee dropping into the storage-bin 4. This bin 4 and another bin 5 for sugar are conveniently located above a track 6, upon which are trucks 7 and 8 to receive the ground coffee and granulated sugar, respectively. The track 6 leads to a weighing-scale 9, whereon the contents of each truck may be weighed to secure the proper proportions of the two materials. Beyond the scale is a chute or hopper 10, through which the contents of the trucks may be deposited in a suitable mixer 11. After this mixer is loaded it is closed and is thereafter rotated long enough to thoroughly mix the granulated materials. After the materials are mixed the mixture is dumped from the mixer into the hopper 12 beneath. From this hopper the material is drawn off into the hopper 13 of the pulverizing-mill. This pulverizing-mill comprises said hopper 13, a suitable feed mechanism 14, rotary beaters 15, operating upon a suitable grinding-surface 16, and a separator 17. The separator 17 is preferably of the conical type, and from this separator the material is discharged into the receiving-box 18, on top of which are a series of cloth frames 19, through the cloth upon which the air that is employed in the pulverizing-mill and in the process of separation is discharged, leaving the fine material in the box. The pulverizer that I prefer is of the rotary type, wherein the beaters do not engage with the grinding-surface, operating only to beat and break the particles of material fed thereto, centrifugal action having much to do with the above process of pulverization and separation, which latter process may be otherwise termed "the process of grading," by which only particles of a desired size are permitted to escape from the pulverizer. As the comparatively coarse material from the hopper 13 reaches the beaters of the mill and is acted upon thereby, the granulated coffee is broken into fine particles, the same and the sugar being reduced to an impalpable powder. Meantime the oils and the like in the coffee which are forcibly liberated and extracted from the cells of the coffee-beans are forced into intimate contact with the particles of sugar, which take up or absorb said oils and essences, and the resultant product which is deposited in the receiving-box is absolutely dry and retains its powdered form instead of being sticky, oily, or paste-like. This is true to such an extent that whereas ordinarilypulverized coffee when placed upon a plate, clean paper, or cloth will soon stain the same my product may be placed or packed in paper or cloth indefinitely and will not stain or discolor the same, the complete absorption and retention of the coffee-oils by the sugar being thus demonstrated. To secure this result, I prefer to employ a proportion of from fifty to thirty-three per cent. of sugar in the composition, and I find that a greater quantity of sugar is required when coffee of a low grade is used than when the grade is high. It is obvious that any bean similar to the coffee-bean, such as cocoa, can be treated in the same manner. Besides the sugar I may add desiccated milk for an obvious purpose, and I may also add a small quantity of carbonate of lime, the purpose thereof being to settle the coffee when a beverage is made.

To obtain a delicious beverage from my composition, it is only necessary to place a small quantity thereof in a cup or suitable receptacle and pour boiling water thereon, and the strength of the beverage may be regulated by the length of time—say from one to five minutes—that it is allowed to stand or brew.

Having thus described my invention, I claim as new and desire to secure by Letters Patent—

1. The herein-described beverage composition containing pulverulent bean material and pulverulent absorbent material in substantially the proportions named, thoroughly admixed, and the particles of absorbent material containing the major portion of the original oils of said bean material, substantially as described.

2. The herein-described coffee composition containing impalpable roasted coffee tissue and impalpable sugar thoroughly admixed, and the particles of sugar holding in absorption the major portion of the coffee-oils, substantially as described.

3. The herein-described beverage composition containing impalpably pulverulent and thoroughly-admixed bean material, absorbent material, desiccated milk, and carbonate of lime, the particles of absorbent material being impregnated with the oils of the bean material, substantially as described.

4. The herein-described beverage composition containing impalpable roasted bean material admixed with impalpable sugar and desiccated milk, the particles of sugar being impregnated with the major portion of the bean-oils, substantially as described.

5. The herein-described composition containing impalpable admixed coffee, sugar, and carbonate of lime, and the particles of sugar being impregnated with the major portion of the coffee-oils, substantially as described.

6. A coffee composition containing an impalpably pulverulent mixture of coffee and absorbent material, the latter containing the major portion of the oil of the coffee separated during pulverization, substantially as described.

7. The herein-described beverage composition containing roasted bean material in a separated condition, the liquid principles thereof being held in a suitable absorbent material admixed with said bean material, and the mass being in a condition of impalpable subdivision, substantially as described.

8. The process of manufacturing the beverage composition of bean material that consists in mixing a suitable absorbent material with the roasted bean material, breaking the particles thereof by attritional forces, separating the liquid principles from said bean material by forces tending to project the particles, causing the absorption of the major portion of the said liquid principles by said absorbent material, and continuing the operation of said forces until the mixture is reduced to a dry, impalpable powder, substantially as described.

9. The process of manufacturing a composition of coffee or the like, that consists in mixing a suitable absorbent material with the coffee material, and then subjecting the mixture to the operation of reductional and centrifugal forces within a limited space, and thereby causing the separation of the solid and liquid principles of the coffee and the absorption of the major portion of the said liquid principles by said absorbent material during the process of reduction, to impalpability, as and for the purpose specified.

10. The process of manufacturing a composition of coffee or the like, that consists in mixing a suitable absorbent material with the coffee material, and then subjecting the mixture to the operation of reductional and centrifugal forces within a limited space, and thereby causing the separation of the solid and liquid principles of the coffee and the absorption of the major portion of the said liquid principles by said absorbent material during the process of reduction to impalpability, and driving cool air through said limited space, as and for the purpose specified.

11. The herein-described process of manufacturing coffee composition that consists in mixing a major portion of roasted coffee with a minor portion of absorbent material, pulverizing the mixture, and simultaneously and continuously extracting the coffee-oils from the cellular tissue and absorbing the same in said absorbent material until the mixture is reduced to impalpability, substantially as described.

In testimony of the foregoing I have hereunto subscribed my name, this 8th day of November, A. D. 1900, in the presence of two witnesses.

JOSEPH M. SCHUTZ.

Witnesses:
C. G. HAWLEY,
M. E. GOOLEY.